United States Patent [19]
McBride

[11] 3,888,017
[45] June 10, 1975

[54] METHOD FOR PREPARATION OF FINE PARTICLE SIZE INORGANIC OXIDIZERS

[75] Inventor: David A. McBride, Cumberland, Md.

[73] Assignee: Hercules Incorporated, Wilmington, Del.

[22] Filed: Mar. 25, 1974

[21] Appl. No.: 454,625

[52] U.S. Cl. .................................... 34/5; 34/8
[51] Int. Cl. ...................... F26b 5/06; F26b 5/08
[58] Field of Search .................... 34/5, 8, 58, 92

[56] References Cited
UNITED STATES PATENTS

| | | | |
|---|---|---|---|
| 3,228,838 | 1/1966 | Rinfret et al. | 34/5 |
| 3,755,530 | 8/1973 | Avila | 34/5 |

*Primary Examiner*—John J. Camby
*Attorney, Agent, or Firm*—Michael B. Keehan

[57] ABSTRACT

Inorganic oxidizers are prepared in the form of minute particles by a process in which an aqueous solution of the oxidizer is centrifugally dispersed by the action of a disc spinning at a high velocity. The aqueous solution of oxidizer is dispersed as tiny droplets having a high radial velocity. The droplets are quenched by a cold liquid at temperatures of about −20°C., at which temperature the inorganic oxidizers crystallize from solution. The resulting mixture of oxidizer particles, water and quenching liquid is freeze dried to remove water and quenching liquid from the tiny oxidizer particles by sublimation.

12 Claims, No Drawings

METHOD FOR PREPARATION OF FINE PARTICLE SIZE INORGANIC OXIDIZERS

This invention relates to a process for the production of ultra-fine oxidizer particles. More particularly, this invention relates to a process for freeze drying an aqueous solution of inorganic oxidizers whereby very fine oxidizer particles can be produced.

Ultra-fine particles of inorganic oxidizers are required in some propellant formulations in order to obtain a high burning rate, solid propellant for rockets. It is well known that increased burning rate and thrust in rocket motors can be obtained by increasing the surface area of the oxidizer employed in the propellant composition. Current methods of producing fine particle inorganic oxidizers are grinding and ball milling of oxidizers and freeze drying of a frozen solution of oxidizers such as the freeze drying of ammonium perchlorate in water. Processes of this general type are disclosed in detail in U.S. Pat. No. 3,452,445; and U.S. Pat. No. 3,685,163. Spray freezing of oxidizer solutions has also been employed as a method for production of fine particles of oxidizers. Spray freezing has been accomplished by such methods as mist generation by ultrasonics and spray formation with standard single and double fluid nozzles. Freezing is accomplished with a cold liquid, typically either liquid nitrogen or a chilled hydrocarbon or fluorocarbon. Spray freezing has received only marginal acceptance because of the difficulty of collecting and freezing a spray. As spray droplet size decreases it becomes more difficult to contact the droplet with a freezing medium. Fine droplets generated by nozzles or by ultrasonics possess relatively low momentum and thus usually require an air current to convey the finest particles from the point of droplet generation to the point of contact with the freezing medium. Trapping and freezing of the fine droplets is essentially dust scrubbing, and requires cooling, not only of the solution droplets but also of the carrier air stream.

It is an object of this invention to provide an improved process for preparing inorganic oxidizers of very small particle size, say of less than about 1 micron weight median diameter (WMD) utilizing a method which will induce crystallization of the inorganic oxidizer from solution.

Other objects of this invention will, in part, be obvious and will, in part, appear hereinafter. For a complete understanding of the nature and objects of this invention, reference is made to the following detailed description.

In accordance with this invention, a process is provided for preparation of fine particle size inorganic oxidizers comprising (a) forming an aqueous solution of an inorganic oxidizer selected from the group consisting of ammonium perchlorate, sodium perchlorate, potassium perchlorate, ammonium nitrate, sodium nitrate and potassium nitrate, (b) centrifugally dispersing said solution into a spray of fine droplets having a high radial velocity, (c) impinging said droplets on a film of quenching liquid at a velocity sufficient for the droplet to penetrate the surface of the quenching liquid, said quenching liquid being a non-solvent for the inorganic oxidizer in solution in said droplet and said quenching liquid being at a temperature sufficiently low to substantially instantaneously reduce the temperature of the droplet upon impingement with the quenching liquid whereby the inorganic oxidizer crystallizes from said droplets forming fine particles, (d) subliming water and quenching liquid from the crystallized inorganic oxidizer particles, and (e) recovering inorganic oxidizers having a weight medium diameter of less than about one micron.

The process of this invention is more fully illustrated in the examples which follow. In the examples, parts and percentages are by weight unless otherwise specified.

EXAMPLE 1

A cone shaped rotating cup having a diameter of one and one-half inches is placed coaxially inside an insulated cylindrical container. The cylindrical container has an inside diameter of about 9 inches, is closed on one end, and has a lip extending inwardly from the open end. Liquid nitrogen (quenching liquid) is poured into the cylindrical container, partially filling same. The container is then rotated at from about 200 to about 500 r.p.m. A wall of liquid nitrogen forms over the interior lateral surface of the container. The cone shaped cup located within said container is then rotated at a speed of approximately 25,000 r.p.m. A 15% aqueous solution of ammonium perchlorate is fed at a rate of 50 milliliters per minute to the inner surface of the rotating cup. The solution is rapidly distributed as a thin film over the inner surface of the cup and is centrifugally dispersed in the form of minute droplets at a high radial velocity from the peripheral surface of said rotating cup. The droplets impinge the wall of liquid nitrogen dispersed over the interior lateral wall of the insulated cylindrical container. Ammonium perchlorate crystals form from the droplets substantially instantaneously from impact with the quenching liquid. After operation of the dispersing equipment for about one minute, operation of the rotating cup and the rotating cylinder is stopped. Fine particle ammonium perchlorate crystals are recovered from the liquid nitrogen by filtration and are freeze dried. The freeze drier is a Repp Model FFD-15-WS Vacuum Sublimater. The freeze drier is operated at a reduced pressure of between about 300 microns and about 50 microns Hg during the drying cycle. The pressure at the end of the drying cycle is about 50 microns Hg. At the end of the drying cycle ammonium perchlorate particles are recovered. The recovered ammonium perchlorate particles have a Weight Median Diameter of about 0.5 micron as determined by use of a Mine Safety Appliance Particle Analyzer (MSA). The term Weight Median Diameter (WMD) means the diameter below which all particles having a diameter less than the Weight Median Diameter constitute one-half the weight of all the particles.

EXAMPLE 2

Example 1 is repeated substituting dry ice cooled normal heptane having a temperature of −78°C. for the liquid nitrogen quenching liquid. The rotating cup is driven at a speed of 31,000 r.p.m. and a 15% ammonium perchlorate solution is fed into the cup at a feed rate of 55 milliliters per minute. Frozen ammonium perchlorate particles are recovered from the cold heptane by filtration and are freeze dried under the conditions set forth in Example 1. Ammonium perchlorate particles are recovered having a Weight Median Diameter of about 0.42 micron.

The inorganic oxidizers which can be prepared in accordance with the process of this invention include perchlorates such as ammonium perchlorate, sodium perchlorate, and potassium perchlorate, and nitrates such as ammonium nitrate, sodium nitrate and potassium nitrate. The preferred inorganic oxidizer is ammonium perchlorate. The ammonium perchlorate employed in forming the solution of ammonium perchlorate can be of a commercial grade material. Higher grade ammonium perchlorate can be employed if desired. Ammonium perchlorate solution and aqueous solutions of the other inorganic oxidizers which can be employed in the process of this invention are preferably prepared with deionized water or other suitably purified water as solvent to avoid introduction of impurities. Aqueous solutions of inorganic oxidizers which can be employed in the process of this invention preferably comprise, by weight, from about 85% to about 95% water and from about 15% to about 5% of inorganic oxidizer. If the weight percent of inorganic oxidizer in aqueous solution is below about 5%, the process of this invention is not economical. As the weight percent of inorganic oxidizer in solution exceeds about 15%–20% by weight at room temperature, the solution approaches saturation (depending on temperature) and growth of oxidizer crystals can begin. This can be an undesirable situation since crystal growth must be controlled to achieve fine particle oxidizers utilizing the process of this invention.

Quenching liquids which can be employed in the process of this invention are liquids which are non-solvents for the inorganic oxidizer and are immiscible with water. The quenching liquids must be capable of undergoing sublimation in a freeze drying process. Illustrative quenching liquids are liquid nitrogen; chlorinated hydrocarbons such as dichlorodifluoromethane; straight and branched chain aliphatic hydrocarbons having from about 5 to about 12 carbon atoms such as pentane, hexane, heptane, octane, isooctane, nonane, decane, undecane and mixtures thereof; aromatics such as benzene, toluene, orthoxylene, paraxylene, metaxylene, and mixtures thereof; aliphatic alcohols having from about 6 to 12 carbon atoms such as 1-hexanol, 1-octanol, 1-decanol and mixtures thereof and the like. The foregoing list of organic liquids which can be employed as quenching liquids in the process of this invention is illustrative and in no way limiting of organic liquids which can be employed in the process of this invention.

In the process of this invention centrifugally dispersing an aqueous inorganic oxidizer solution into a spray of fine droplets is critical. The droplets formed must have a high radial velocity which can be provided by feeding the aqueous solution of inorganic oxidizer onto the surface of a rapidly rotating member having a cross section which is circular at any point perpendicular to the central axis through the member. The rotating member must rotate at a high speed. The droplet size produced by centrifugally dispersing the solution will vary directly with the feed rate of the aqueous inorganic solution to the surface of the rotating member, and inversely with rotational speed and diameter of the rotating member. The rotating member preferably has the shape of either a cup or disc. The rotational speed of the rotating member must be such as to produce minute droplets of aqueous inorganic oxidizer solution having a high radial velocity. The particle size of the crystallized oxidizer particle produced in accordance with the process of this invention varies directly with the size of the droplet produced. While the rotational speed necessary to produce minute droplets may vary with the diameter of the rotating member, it has been found that the rotational rate of the rotating member must be at least about 4,000 revolutions per minute for satisfactory centrifugal dispersion to take place. For a more detailed discussion on the effect of operating parameter influence on droplet size and spray theory, reference is hereby made to the following articles: Johnson, R. E. and Thring, M. W., "Pilot Plants, Models, and Scale-up Methods in Chemical Engineering," New York, McGraw-Hill, 1957, pp. 235–238; and Hinze, J. O. and Milborn, H., "Atomization of Liquids by Means of a Rotating Cup," *Journal of Applied Mechanics*, Vol. 145 (June, 1950).

The distance between the exterior surface of the rotating member and the film of quenching liquid is also important. The radial velocity of the droplets must exceed the velocity of air impinging the quenching liquid, as a result of spinning of the rotating member, or billowing of the droplets will occur which results in unsatisfactory operation of the process. Also, if the distance between the exterior surface of the spinning disc and the film of quenching liquid is too great, the droplets will not penetrate the quenching liquid but will coalesce on the surface of the quenching liquid which defeats the purpose of the dispersing step heretofore described.

One suitable method for quenching of the solution of inorganic oxidizer in the process of this invention is achieved by maintaining the quenching liquid as a film of liquid on the interior lateral surface of a cylindrical container surrounding the rotating member. The film of quenching liquid can be provided by filling a portion of a cylindrical container with quenching liquid and rotating the cylindrical container. The rotational speed of the container must be sufficient to force the quenching liquid to form a film about the entire lateral surface of the cylindrical container.

The quenching liquid must be maintained at a temperature sufficiently low such that crystallization of the inorganic oxidizer from the droplets of inorganic oxidizer solution occurs substantially instantaneously upon impact. It is therefore necessary to reduce the temperature of the quenching liquid to below about −20°C. for use in the process of this invention.

In the process of this invention supersaturation is the driving force for both inorganic oxidizer crystal formation and crystal growth. Nucleation or crystal formation is favored by a high degree of supersaturation of inorganic oxidizer solute in water. A high degree of supersaturation is achieved in the process of this invention, therefore favoring crystal formation, by rapid penetration of the inorganic oxidizer droplets into the quenching liquid. The very low temperature of the quenching liquid effects a substantially instantaneous solution temperature drop, resulting in supersaturation of the inorganic oxidizer in water, resulting in formation of tiny oxidizer crystals.

What I claim and desire to protect by Letters Patent is:

1. A process for preparation of fine particle size inorganic oxidizers comprising:

a. forming an aqueous solution of an inorganic oxidizer selected from the group consisting of ammonium perchlorate, sodium perchlorate, potassium perchlorate, ammonium nitrate, sodium nitrate and potassium nitrate, b. centrifugally dispersing said solution into a spray of fine droplets having a high radial velocity, c. forming a film of quenching liquid, said quenching liquid being a nonsolvent for the inorganic oxidizer in solution, said quenching liquid being at a temperature at which crystallization of the fine droplets of inorganic oxidizer solution will occur substantially instantaneously upon penetration of said film by said droplets, d. impinging the fine droplets of step (b) on the film of quenching liquid at a velocity sufficient for the droplets to penetrate the surface of the quenching liquid whereby the inorganic oxidizer crystallizes from said droplets forming fine inorganic oxidizer particles, e. subliming water and quenching liquid from the crystallized inorganic oxidizer particles, and f. recovering inorganic oxidizers having a weight medium diameter of less than about one micron.

2. The process of claim 1 in which the quenching liquid is maintained at a temperature of below about −20°C.

3. The process of claim 2 in which the inorganic oxidizer solution comprises, by weight, from about 85% to about 95% of water and from about 15% to about 5% inorganic oxidizer.

4. The process of claim 2 in which the inorganic oxidizer is ammonium perchlorate.

5. The process of claim 4 in which the quenching liquid is liquid nitrogen.

6. The process of claim 2 in which the inorganic oxidizer is sodium perchlorate.

7. The process of claim 2 in which the inorganic oxidizer is potassium perchlorate.

8. The process of claim 2 in which the inorganic oxidizer is ammonium nitrate.

9. The process of claim 2 in which the inorganic oxidizer is sodium nitrate.

10. The process of claim 2 in which the inorganic oxidizer is potassium nitrate.

11. The process of claim 1 in which the spray of fine droplets of high radial velocity is formed by centrifugally dispersing the oxidizer solution from the surface of a disc spinning at a rate of at least 4,000 revolutions per minute.

12. The process of claim 1 in which the spray of fine droplets of high radial velocity is formed by centrifugally dispersing the oxidizer solution from the surface of a cup shaped member spinning at a rate of at least 4,000 revolutions per minute.

* * * * *